United States Patent Office 3,277,203
Patented Oct. 4, 1966

3,277,203
PROCESS FOR REACTION OF ALUMINUM
ALKYLS TO FORM OLEFINS
Michael B. Keehan and Jerry A. Acciarri, Ponca City,
Okla., assignors to Continental Oil Company, Ponca
City, Okla., a corporation of Oklahoma
No Drawing. Filed Apr. 28, 1961, Ser. No. 106,163
16 Claims. (Cl. 260—677)

This invention relates to the preparation of olefins from aluminum alkyls. In one aspect, it relates to the displacement of olefins from aluminum alkyl growth product at elevated temperatures.

One method for the preparation of olefins, particularly olefins of increased molecular weight, involves the reaction of an aluminum alkyl compound, such as aluminum triethyl, with a low molecular weight olefin, for example, ethylene, to form an aluminum alkyl growth product in which the alkyl groups contain a wide range of carbon atoms.

The growth product thus formed is further reacted with ethylene to displace higher olefins which can be recovered as product from the reaction mass. In one displacement method, the olefin is reacted with aluminum alkyl growth product in the presence of a finely divided metal catalyst, such as, finely divided nickel. The catalyzed displacement reaction is carried out usually at temperatures from about 80 to about 120° C., pressures from about 200 to about 4,000 p.s.i.g., and for about 2 to about 30 minutes. While the catalyzed displacement reaction is very effective in providing the desired olefins, the use of a catalyst has disadvantages in that the catalyst is difficultly removable from the aluminum alkyl and may prevent the reuse of the latter material in the growth process. Also in the separation of olefins formed in the displacement reaction from the aluminum alkyl, for example, by distillation, the presence of the catalyst often produces undesirable reactions, such as, reverse displacement and isomerization of olefins.

A second displacement method is also available in which displacement is effected at elevated temperatures in the absence of a catalyst. This method is very effective when carried out under appropriate temperatures and pressures and with extremely short reaction times. It has been found, however, that the elevated temperatures required for thermal displacement can cause decomposition of the aluminum alkyls, with the result that the reactor, which is ordinarily of the tubular type becomes fouled with aluminum and can be completely plugged after a relatively short process reaction period. As a result, the amount of aluminum triethyl which can be recovered from the displacement product is reduced, and in addition the aluminum metal promotes side reactions which destroy normal alpha-olefin product.

It is an object of this invention to provide an improved process for the preparation of olefins.

Another object of this invention is to provide an improved noncatalytic process for the thermal displacement of olefins from aluminum alkyls.

Still another object of this invention is to provide an improved process for the noncatalytic thermal displacement from aluminum alkyls without the decomposition of aluminum alkyl to elemental aluminum.

These and other objects of the invention will become more readily apparent from the following detailed description and discussion.

The foregoing objects are achieved broadly by reacting aluminum alkyl with low molecular weight alpha-olefin to displace olefin from said aluminum alkyl, the reaction being carried out under conditions including elevated temperature at which aluminum alkyl ordinarily decomposes to elemental aluminum and preventing the decomposition of aluminum alkyl by carrying out the displacement reaction in the presence of a hydrocarbon diluent which remains in the liquid state under the displacement reaction conditions.

In one aspect, the invention is directed to a process in which the aluminum alkyl is reacted with low molecular weight alpha-olefin to displace olefin from said aluminum alkyl during passage of the reactants through a tubular reaction zone.

The process of this invention finds application broadly in the treatment of aluminum alkyls, either individually or in admixture. The invention is particularly applicable, however, to the treatment of aluminum alkyls prepared by the reaction of an alkyl aluminum compound, such as aluminum triethyl, with a low molecular weight mono-1-olefin, such as ethylene. This reaction can be illustrated equationwise as follows:

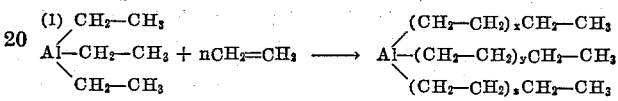

wherein $x$, $y$ and $z$ represent integers ranging from 0-14 (average 3-7) and $x+y+z=n$.

The foregoing reaction is carried out by passing ethylene through triethylaluminum, preferably in the presence of a diluent under a wide variety of reaction conditions, e.g., 150–300° F. and 200–5,000 p.s.i.g., preferably 195–250° F., and 1,000–3,500 p.s.i.g. It is to be understood that, instead of employing triethylaluminum as the starting trialkylaluminum in the above reaction, other low molecular weight alkyl ($C_2$–$C_4$) aluminum compounds, such as tripropylaluminum, tributylaluminum, triisobutylaluminum, diethylaluminum hydride, ethylaluminum dihydride, etc., can be employed; and in lieu of ethylene, other low molecular weight aliphatic mono-1-olefins, such as propylene, butene, and the like may be substituted. Generally, $C_2$–$C_4$ olefins are preferred as the growth hydrocarbon compound.

The growth product is subjected to displacement by reaction with ethylene at elevated temperatures between about 500 and about 600° F. and preferably between about 540 and about 570° F. This reaction is carried out at a pressure between about 225 and about 300 p.s.i.g., for a time between about 0.5 and about 1.1 seconds and preferably between about 0.6 and about 0.7 second with ethylene to aluminum alkyl mol ratio from about 15 to about 50.

The growth reaction is ordinarily carried out in a diluent which can be a paraffin, cycloparaffin, or aromatic hydrocarbon, for example, isooctane, cyclohexane, benzene, xylene, and the like. This diluent aids in controlling the temperature of the growth reaction which is exothermic and also acts as a solvent for the growth product. Similarly, the displacement reaction, whether catalytic or thermal, has ordinarily been carried out in the presence of a diluent, usually the same diluent as employed in the growth reaction. As pointed out previously, the problem of aluminum alkyl decomposition was not encountered in catalytic displacement, since this process, at least with the presently known catalysts, has been carried out at relatively low temperatures. On the other hand, when thermal displacement at elevated temperatures is employed, the pressures ordinarily used are not sufficient to prevent partial and sometimes complete vaporization of the solvents which are ordinarily employed in the growth and displacemnt reactions. The existence of the problem of aluminum alkyl decomposition arose and was first discovered during attempts to thermally displace olefins from growth product in the presence of the ordinary diluents employed previously in the growth and displacement reactions. After considerable study of this problem, it was determined that decomposition of the aluminum alkyls occurred only after substantial vaporization of diluent had taken place, whereby the concentration of diluent in the aluminum alkyl was reduced to less than about 6 percent by weight. With the realization of the problem and establishment of the cause thereof, it was ascertained that aluminum alkyl decomposition could be prevented either by the use of different solvents from those previously employed or by the employment of different operating conditions, or a combination of the two. While a certain degree of flexibility is possible within the conditions of temperature and pressure employed for thermal displacement, the more desirable solution to the problem is to provide solvents or diluents having higher boiling points than those previously employed. The preferred procedure is to employ the maximum pressure at optimum temperature conducive to high yields of olefin product, in combination with a solvent having sufficiently high boiling point to maintain proper dilution of the aluminum alkyl during the displacement reaction.

When the process is directed to the displacement of aluminum alkyl growth product with ethylene under the conditions previously set forth, it is preferred to employ a solvent or diluent having an atmospheric boiling point of about 280° F. or higher. Suitable diluents include $C_9$ and higher paraffin hydrocarbons, for example, nonane, decane, dodecane, and the like, aromatic hydrocarbons, petroleum fractions of suitable boiling range such as kerosene, naphtha, etc. Again in the displacement of aluminum alkyl growth product with ethylene, it is required that a minimum of diluent be present with the aluminum alkyl, that is, at least about 6 percent by weight of diluent based on the aluminum alkyl. Desirably, the amount of diluent, however, is at least about 10 percent by weight and preferably at least about 20 percent by weight, again based on the aluminum alkyl.

While the precise reason for decomposition of the aluminum alkyl under the elevated temperatures employed in thermal displacement is not known, it appears that this undesirable ffect occurs when the aluminum alkyl is retaind on the reactor wall for an extended period of time. Even though the reactants en masse are subjected to the displacement reaction for only a very short period of time, ordinarily by passing the reactants through a tubular reaction zone at a very high velocity, the liquid which adjoins the wall of the reaction zone moves at a substantially lesser velocity than the velocity of the main stream of flowing reactants. It is apparently at the tube wall that the decomposition reaction occurs, when insufficient concentration of diluent is maintained in the reaction zone. With larger amounts of diluent, the aluminum alkyl, even at the tube wall, is sufficiently diluted to prevent decomposition, as pointed out previously and as exemplified hereinafter by the examples illustrating the invention.

The following examples are presented in illustration of the invention. The examples were obtained by subjecting aluminum alkyl growth product in the presence of ethylene and a liquid diluent to elevated temperature and pressure to effect thermal displacement of olefins from the growth product. The displacement reactions were carried out in a tubular reaction zone enclosed within a vessel containing a heated liquid, heat being provided to said liquid by electric heaters. The ethylene and aluminum alkyl growth product wer mixed at the top of the reactor and flowed downwardly through the tubular reactor. Immediately following the reaction, th product leaving the reactor was quenched in a cooler and then further cooled in a heat exchanger to 100–110° F. Ethylene was then separated from the displacement product mixture in a liquid-gas disengaging chamber and recycled to the reactor. The displacemnt product was analyzed by G.L.P.C. (gas-liquid phase chromatography).

The growth product which was employed in the examples was obtained by reacting aluminum trithyl with ethylene in a batch process at 1,500 p.s.i.g. and 240–248° F. The specific conditions employed are presented in Table I.

TABLE I.—GROWTH PRODUCT DATA

| Run No. | Growth Solvent | Residence Time, min. | Temperature, °F. | "m" Value [1] |
|---|---|---|---|---|
| MBK-910-(164, 170, 173) | Iso-octzne | 150 | 252 | 2.8 |
| MBK-910-(178, 179, 181-4, 188, 190). | do | 148 | 244 | 4.0 |
| MBK-1108-(5, 23, 24, 28, 29). | Para-xylene | 157 | 243 | 3.28 |
| MBK-1108-(69, 70) | do | 148 | 244 | 4.0 |

[1] The average number of ethylene units added to each alkyl aluminum bond of the aluminum triethyl.

The conditions employed during displacement and the results obtained are presented in Table II:

TABLE II

| Ex. No. | Run No. | Displacement Conditions | | | Ethylene | | Growth Product | | | Displacement Product | | |
|---|---|---|---|---|---|---|---|---|---|---|---|---|
| | | Temp., °F. | Total pressure, p.s.i.g. | Residence time,[1] sec. | Rate, s.c.f.m. | Percent molar excess | Feed rate, lb./hr. | "m" Value [2] | Percent solvent by weight [3] | Solvent | Percent conversion to all olefins | Percent conversion to $C_{18}$ olefins [4] | Percent conversion to n-Alpha $C_{18}$ olefins [5] |
| 1 | MBK-910-173 | 500 | 150 | 0.96 | 4.17 | 855 | 13.8 | 2.76 | 23.3 | Iso-octane | 82.2 | 82.2 | 62.2 |
| 2 | MBK-910-164 | 500 | 150 | 0.96 | 4.17 | 1,640 | 6.9 | 2.76 | 23.3 | do | 95.0 | 95.0 | 89.7 |
| 3 | MBK-910-170 | 550 | 150 | 0.92 | 4.17 | 1,640 | 6.9 | 2.76 | 23.3 | do | 96.2 | 96.2 | 83.5 |

Remarks: In all these runs, the aluminum alkyl decomposition was very heavy, approximately 4–6% of the aluminum fed plated out on the reactor tube.

| 4 | MBK-910-178 | 500 | 150 | 0.96 | 4.17 | 2,343 | 6.9 | 3.8 | 26.4 | Iso-octane | 94.0 | 94.0 | 83.6 |
| 5 | MBK-910-179 | 550 | 150 | 0.92 | 4.17 | 2,494 | 6.9 | 3.8 | 26.4 | d9 | 98.0 | 98.0 | 90.1 |
| 6 | MBK-910-181 | 600 | 150 | 0.88 | 4.17 | 2,274 | 6.9 | 3.8 | 26.4 | do | 98.0 | 98.0 | 90.5 |
| 7 | MBK-910-182 | 500 | 150 | 0.96 | 4.17 | 2,530 | 6.9 | 3.8 | 26.4 | do | 94.0 | 94.0 | 87.0 |
| 8 | MBK-910-183 | 525 | 150 | 0.94 | 4.17 | 2,666 | 6.9 | 3.8 | 26.4 | do | 98.0 | 98.0 | 93.9 |
| 9 | MBK-910-184 | 550 | 150 | 0.92 | 4.17 | 2,188 | 6.9 | 3.8 | 26.4 | do | 98.0 | 98.0 | 94.5 |

Remarks: Aluminum plated out during each run; approximately 4–6% of the aluminum fed. The first three runs were made with aluminum metal on the tube wall. The last three runs were made only after the tube wall was cleaned and freed from aluminum previous to the start of each.

Footnotes at end of table.

TABLE II—Continued

| Ex. No. | Run No. | Displacement Conditions ||| Ethylene || Growth Product |||| Displacement Product |||
|---|---|---|---|---|---|---|---|---|---|---|---|---|---|
| | | Temp., °F. | Total pressure, p.s.i.g. | Residence time,[1] sec. | Rate, s.c.f.m. | Percent molar excess | Feed rate, lb./hr. | "m" Value [2] | Percent solvent by weight [3] | Solvent | Percent conversion to all olefins | Percent conversion to C$_{18}$ olefins [4] | Percent conversion to n-Alpha C$_{18}$ olefins [5] |
| 10 | MBK-910-188 | 550 | 150 | 0.92 | 4.17 | 3,625 | 4.8 | 3.8 | 26.4 | Iso-octane | 99.0 | 99.0 | 89.4 |
| 11 | MBK-910-190 | 500 | 150 | 0.96 | 4.17 | 4,143 | 4.8 | 3.8 | 26.4 | do | 98.0 | 98.0 | 92.9 |

Remarks: Aluminum alkyl decomposition (4–6% of amount fed) plated out aluminum during the runs.

| 12 | MBK-910-201 | 530 | 150 | 1.17 | 4.17 | 1,922 | 6.9 | ([6]) | 75 | Xylene plus kerosene. | 98.0 | | |

Remarks: No aluminum alkyl decomposition; no aluminum plating out on reactor tube wall.

| 13 | MBK-1108-5 | 500 | 150 | 1.20 | 4.17 | 1,700 | 6.9 | 3.3 | 20.0 | Xylene | 98.0 | 98.0 | 84.5 |

Remarks: Aluminum metal deposited on reactor tube wall from alkyl decomposition.

| 14 | MBK-1108-23 | 500 | 200 | 0.98 | 4.17 | 1,940 | 6.9 | 3.3 | 20.0 | Xylene | 97.0 | 97.0 | 90.3 |
| 15 | MBK-1108-24 | 525 | 200 | 0.95 | 4.17 | 2,490 | 6.9 | 3.3 | 20.0 | do | 96.0 | 96.0 | 83.3 |
| 16 | MBK-1108-28 | 500 | 225 | 0.98 | 4.17 | 2,130 | 6.9 | 3.3 | 20.0 | do | 97.0 | 98.0 | 88.0 |
| 17 | MBK-1108-29 | 550 | 225 | 0.93 | 4.17 | 2,190 | 6.9 | 3.3 | 20.0 | do | 96.0 | 96.0 | 88.0 |

Remarks: No aluminum metal plated out on reactor tube wall.

| 18 | MBK-1108-69 | 540 | 225 | 0.77 | 9.6 | 1,400 | 18.85 | 4.0 | 10.0 | Para-xylene | 97.1 | 97.1 | 83.6 |

Remarks: No aluminum.

| 19 | MBK-1108-70 | 550 | 225 | 0.77 | 9.6 | 1,310 | 18.85 | 4.0 | 6.0 | Para-xylene | 96.52 | 96.52 | 85.71 |

Remarks: Some alkyl decomposition.

[1] Based on ethylene flow through the reactor tube.
[2] The average number of ethylene units added to each alkyl aluminum bond of the aluminum triethyl.
[3] Based on the growth product.
[4] Percent of C$_{18}$ alkyls converted to all C$_{18}$ olefins.
[5] Percent of C$_{18}$ alkyls converted to C$_{18}$ normal alpha-olefin.
[6] Co-dimerization product of propylene and aluminum triethyl.

In Table II, examples 1, 2 and 3, shows that substantial aluminum alkyl decomposition to aluminum occurs when the displacement reaction conditions are such that the growth solvent (isooctane) vaporizes. In these runs, the liquid phase aluminum alkyl concentration on the tube wall reached about 95–100 percent. After 19 hours of operation, the reactor became completely plugged with aluminum metal.

Examples 4 through 9 show that the presence of aluminum metal in the reactor tube (from aluminum alkyl decomposition) promotes adverse side reactions during the product normal alphaolefins and converts these alpha-olefins to internal olefins or branched alpha-olefins. Examples 4–6 were carried out in reactor tubes in which sufficient aluminum had been deposited by aluminum alkyl decomposition so that the reactor tube was essentially coated with aluminum. Examples 7–9 were carried out in a reactor tube which was initially free from aluminum deposits. Comparing these runs, it is noted that the conversion to n-alpha-C$_{18}$ olefins is substantially higher in Examples 7–9 than in Examples 4–6, for the same displacement conditions.

Examples 10 and 11 show that a high percent molar excess of ethylene in the reactor tube does not eliminate aluminum alkyl decomposition to aluminum metal, conditions otherwise being the same.

Example 12 illustrates that aluminum alkyl decomposition to metallic aluminum can be prevented when a solvent is employed which does not completely vaporize at displacement conditions, that is, sufficient liquid solvent remains to prevent decomposition. In this example, the codimerization product of propylene and aluminum triethyl was made in xylene solvent. To this was added 50 weight percent sweetened kerosene which was of sufficient boiling point to remain in the liquid state under the displacement conditions. There was no evidence of aluminum alkyl decomposition to aluminum metal in this example.

Example 13 illustrates that aluminum alkyl decomposes to metallic aluminum in the presence of xylene under displacement conditions at which xylene boils. Thus again in this Example, the aluminum alkyl concentration of the reactor tube wall was about 95–100 percent.

In Examples 14 through 17, the displacement conditions were such that xylene was below its boiling point in the reactor and thus remained in the liquid state. No aluminum alkyls decomposed to aluminum metal during these runs.

Having thus described the invention by providing specific examples thereof, it is to be understood that no undue limitations or restrictions are to be drawn by reason thereof and that many variations and modifications are within the scope of the invention.

We claim:
1. In a noncatalytic process for the preparation of olefins in which aluminum alkyl is reacted with low molecular weight alpha-olefin to displace olefin from said aluminum alkyl under conditions, including elevated tem- perature, at which said aluminum alkyl decomposes to elemental aluminum, the improvement which comprises carrying out said reaction for a residence time between about 0.5 and about 1.1 seconds and in the presence of a hydrocarbon diluent which remains in the liquid state under the displacement reaction conditions including temperature in the range of about 500 to about 600° F., the amount of said diluent being sufficient to prevent decomposition of said aluminum alkyl.

2. In a noncatalytic process for the preparation of olefins in which aluminum alkyl is reacted with a low molecular weight alpha-olefin at a temperature between about 500 and about 600° F. to displace olefin from said aluminum alkyl and in which decomposition of said aluminum alkyl to elemental aluminum occurs, the improvement which comprises carrying out the reaction for a residence time between about 0.5 and about 1.1 seconds and in the presence of a hydrocarbon diluent which remains in the liquid state under the displacement reaction conditions, said diluent being present in the reaction system in a concentration of at least 6 percent by weight of the aluminum alkyl.

3. The process of claim 2 in which the concentration of the diluent is at least 20 weight percent of the aluminum alkyl.

4. The process of claim 3 in which the low molecular weight alpha-olefin is ethylene.

5. The process of claim 4 in which the hydrocarbon diluent is paraxylene.

6. The process of claim 4 in which the hydrocarbon diluent is kerosene.

7. In a noncatalytic process in which aluminum triethyl is reacted with ethylene to provide a mixture of aluminum alkyls of higher molecular weight, said mixture of aluminum alkyls is reacted with additional ethylene to displace olefins from said mixture of aluminum alkyls under conditions, including elevated temperature, at which said aluminum alkyl decomposes to elemental aluminum, the improvement which comprises carrying out the displacement reaction for a residence time between about 0.5 and about 1.1 seconds and in the presence of a hydrocarbon diluent which remains in the liquid state under the displacement reaction conditions, said diluent being present in the reaction system in a concentration of at least 20 percent by weight of the aluminum alkyl.

8. In a noncatalytic process in which aluminum triethyl is reacted with ethylene to provide a mixture of aluminum alkyls of higher molecular weight, said mixture of aluminum alkyls is reacted with additional ethylene at a temperature between about 500 and about 600° F. to displace olefins from said mixture of aluminum alkyls and in which decomposition of said aluminum alkyl to elemental aluminum occurs to displace olefins from said mixture of aluminum alkyls, the improvement which comprises carrying out the displacement reaction for a residence time between about 0.5 and about 1.1 seconds and in the presence of a hydrocarbon diluent which remains in the liquid state under the displacement reaction conditions, said diluent being present in the reaction system in a concentration of at least 6 percent by weight of the aluminum alkyl.

9. The process of claim 8 in which the concentration of the diluent is at least 20 weight percent of the aluminum alkyl.

10. The process of claim 9 in which the hydrocarbon diluent is xylene.

11. The process of claim 9 in which the hydrocarbon diluent is kerosene.

12. In a noncatalytic process in which aluminum triethyl is reacted with ethylene to provide a mixture of aluminum alkyls of higher molecular weight and said mixture of aluminum alkyls is reacted with additional ethylene during passage through a tubular reaction zone, to displace olefins from said mixture of aluminum alkyls, under conditions including elevated temperature at which said aluminum alkyl decomposes to elemental aluminum, the improvement which comprises carrying out the displacement reaction for a residence time between about 0.5 and about 1.1 seconds and in the presence of a hydrocarbon diluent which remains in the liquid state under the displacement reaction conditions, said diluent being present in the reaction system in a concentration of at least 6 percent by weight of the aluminum alkyl.

13. In a noncatalytic process in which aluminum triethyl is reacted with ethylene to provide a mixture of aluminum alkyls of higher molecular weight and said mixture of aluminum alkyls is reacted with additional ethylene during passage through a tubular reaction zone at a temperature between about 500 and about 600° F., a pressure between about 200 and 225 p.s.i.g. for between about 0.5 and 1.0 seconds to displace olefins from said mixture of aluminum alkyls and in which decomposition of said aluminum alkyls to elemental aluminum occurs, the improvement which comprises carrying out the displacement reaction in the presence of a hydrocarbon diluent which remains in the liquid state under the displacement reaction conditions, said diluent being present in the reaction system in a concentration of at least 6 percent by weight of the aluminum alkyl.

14. The process of claim 13 in which the concentration of the diluent is at least 20 weight percent of the aluminum alkyl.

15. The process of claim 14 in which the hydrocarbon diluent is xylene.

16. The process of claim 14 in which the hydrocarbon diluent is kerosene.

References Cited by the Examiner

UNITED STATES PATENTS

| | | | |
|---|---|---|---|
| 2,781,410 | 2/1957 | Ziegler et al. | 260—683.15 |
| 2,889,385 | 6/1959 | Catterall et al. | 260—683.15 |
| 2,906,794 | 9/1959 | Aldridge et al. | 260—683.15 |
| 2,927,103 | 3/1960 | Schneider et al. | 260—94.9 X |
| 2,928,815 | 3/1960 | Hammer et al. | 260—94.9 X |
| 3,013,043 | 12/1961 | Ziegler et al. | 260—683 X |
| 3,035,104 | 5/1962 | Harvey et al. | 260—683.15 |
| 3,038,922 | 6/1962 | Synder | 260—448 |

OTHER REFERENCES

Ziegler et al.: Annalen der Chemie, vol. 629, pp. 178–192 (1960).

DELBERT E. GANTZ, *Primary Examiner.*

ALPHONSO D. SULLIVAN, *Examiner.*

C. E. SPRESSER, *Assistant Examiner.*